Feb. 19, 1957     M. W. THOMPSON     2,781,913
GAS AND LIQUID FILTER/SEPARATOR
Filed Jan. 21, 1955
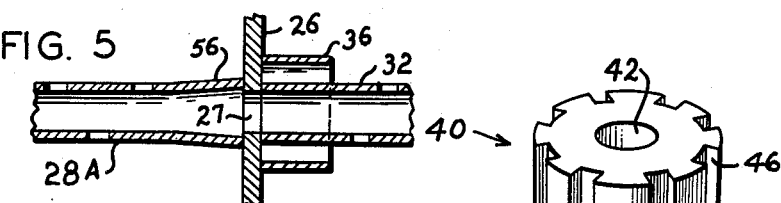
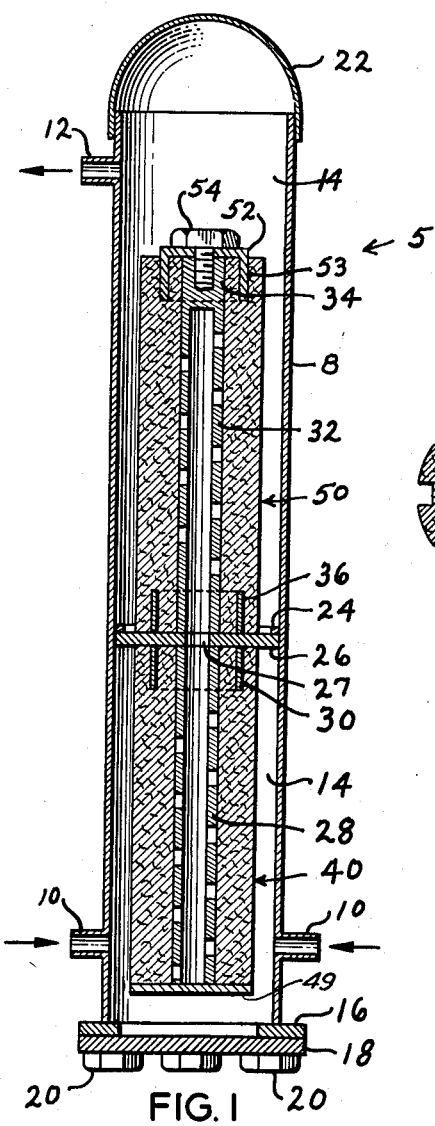
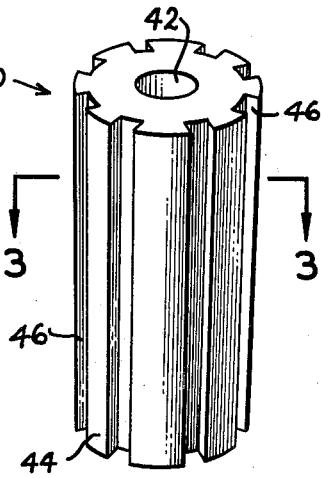
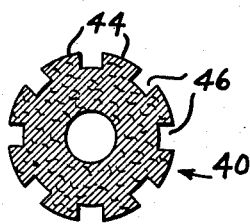
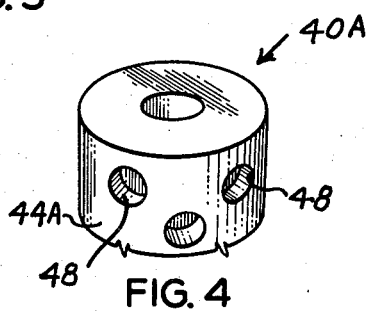
Malcolm W. Thompson
INVENTOR
BY Loyal J. Miller
ATTORNEY United States Patent Office 2,781,913
Patented Feb. 19, 1957

2,781,913

GAS AND LIQUID FILTER/SEPARATOR

Malcolm W. Thompson, Tulsa, Okla.

Application January 21, 1955, Serial No. 483,292

2 Claims. (Cl. 210—120)

The present invention relates to filters, and more particularly to a means for increasing the filtering surface area of a filter element for use in filtering a gas or a liquid.

A number of types of filters have been produced and are available on the open market for filtering gas and the like. Most of these have the common disadvantage of having a limited capacity which is governed by the surface area of the filter element. In other words, the area or surface of the filter will only permit a certain maximum amount or volume of the gas or fluid being cleaned to pass through the element in a given amount of time before the surface of the filter is covered with extraneous matter. Accordingly it is necessary to install a larger filter and element when it is necessary to filter a larger volume of gas.

It is the primary object of this invention to provide a filter which may be comparatively small, and yet will have a large filtering capacity.

Another object of this invention is to provide a filter which will efficiently clean and keep clean the filtered product over a longer period of time than a conventional filter of a comparable size.

Another object of this invention is to provide a filter of the class described which may use a conventional type of filtering element.

A further object of this invention is to provide a filter having a cleaning element which may be easily replaced.

An additional object is to provide a filter of this class which requires little or no attention after being placed in operation.

The present invention accomplishes these and other objects by providing a partitioned tubular jacket having closed ends and perforated tubular members alignedly connected on either side of the partition for communication through the partition. The filter element is placed longitudinally around each respective tubular member and is sealed against the partition by a sleeve rigidly connected to the partition and extending into each respective filter element.

Other objects will be apparent from the following description when taken in conjunction with the accompanying single sheet of drawings, wherein:

Figure 1 is a vertical cross-sectional view of the device;

Figure 2 is a perspective view of one embodiment of the filtering element per se;

Figure 3 is a horizontal cross-sectional view taken substantially along line 3—3 of Fig. 2;

Figure 4 is a fragmentary perspective view of an alternate embodiment of the filtering element; and Figure 5 is a fragmentary cross-sectional view illustrating an alternate sealing means.

Like characters of reference designate like parts in those figures of the drawings in which they occur.

In the drawings:

The reference numeral 5 indicates the device, as a whole, comprising a tubular jacket 8 having a pair of oppositely disposed inlet ports 10 adjacent one end and an outlet port 12 adjacent its opposite end. The ports 10 and 12 communicate with the hollow interior 14 of the jacket 8. To one end of the jacket 8 is rigidly connected, as by welding, an annular flange 16. Diametrically the flange 16 is slightly larger than the jacket 8 and has a central aperture of a selected size. A disk 18 is flatly connected to the flange 16 by suitable bolts 20 for closing the aperture within the flange. The opposite end of the jacket 8 is closed by a friction fitting, as shown, or threadedly engaged cap 22.

Intermediate its ends the interior of the jacket is provided with an annular ring 24, rigidly connected to the wall of the jacket 8. A partition 26 having a diameter substantially equal to the bore of the jacket 8 and in relation thereto is rigidly disposed within the interior 14 adjacent said annular ring 24. The partition has a central perforation 27 of a selected size. A tubular member 28 having a plurally perforated wall is rigidly connected at one end, as by welding, to one side of the partition 26 and projects longitudinally within the jacket 8 ending abruptly in parallel spaced-apart relation with the disk 18. Diametrically the bore of the tubular member 28 is substantially equal with relation to the perforation 27.

A comparatively short tubular sleeve 30 substantially larger, diametrically, than the member 28 is longitudinally disposed within the jacket 8 with one end rigidly connected to the partition 26 in concentric relation with the member 28.

A second tubular member 32, similar to the member 28, having a plurally perforated wall and one closed end 34, has its open end rigidly connected to the side of the partition opposite the member 28 for communication with the member 28 through the perforation 27.

A second similar tubular sleeve 36 is similarly connected at one end to the partition 26 in concentric relation with the member 32.

A filter element 40 of conventional material, for example fiber glass, cylindrical in general configuration and of a selected diameter, preferably smaller than the hollow interior 14 of the jacket 8, has a central longitudinally extending aperture 42. The size of the aperture 42 is such that it is closely received by the periphery of the tubular members 28 and 32. The periphery 44 of the element 40 is preferably provided with a plurality of longitudinally extending grooves 46 cut into the element 40 a selected depth. The purpose of the grooves 46 is to enlarge the surface area of the element 40. Thus it seems evident that a larger amount of extraneous matter may be trapped on the surface of the grooved element 40 than would be possible with an element having a smooth periphery.

Fig. 4 illustrates an alternate embodiment 40A of the filter element. The alternate embodiment is constructed identically with relation to the element 40, except that the periphery 44A is provided with a plurality of rows of recesses 48 in staggered relation for enlarging the surface area of the alternate embodiment.

The disk 18 is removed and a length of the element 40 equal to the length of the member 28 is inserted into the jacket 8 around the member 28. The inwardly disposed end of the element 40 is placed in contact with the partition 26, and as the element contacts the sleeve 30 it penetrates the filter element 40, as shown. The purpose of the sleeve 30 is to prevent any of the fluid or gas, not shown, from leaking by the inwardly disposed end of the element 40. This type of seal is capable of easily withstanding higher pressure drops, up to a hundred pounds per square inch gas, without by-pass leakage. The opposite or free end of the element 40 is sealed by a disk 49, of any suitable material, glued to the element 40.

The cap 22 is removed and a second length of filter or coalescing element 50, identical with relation to the element 40 and equal to the length of the member 32, is similarly placed within the opposite side of the filter jacket 8 around the member 32 with one end sealed adjacent the opposite side of the partition 26 by the sleeve 36. The element 50 is held on the member 32 by a tubular cap 52. The wall 53 of the cap projects into the body of the element 50 and thus prevents any channeling or leaking of the filtered product along the wall of the member 32 and out at the end of the element 50. The cap 52 is flatly held in place adjacent the end 34 by a bolt 54 threadedly engaged with the closed end 34 of the member 32.

Referring now more particularly to Fig. 5, an alternate embodiment of sealing the element 40 with the partition 26 is shown. A tubular member 28A similar to the member 28 having a plurally perforated wall has the end rigidly connected to the partition 26 flared or tapered outwardly slightly as at 56. The tapered portion 56 is preferably large enough, diametrically, to tightly engage the bore 42 of the element 40 and effect a seal therewith.

*Operation*

In operation the filter 5 has its inlet ports 10 connected to the source of gas or fluid to be filtered in a conventional manner, not shown, and the outlet port 12 is similarly connected to convey the cleaned product on its way. The gas or fluid enters the element 40, depositing all extraneous matter on the surface 44 of the element. The cleaned gas or fluid passes through the perforations of the member 28 and into the member 32 through the perforation 27. Then the cleaned product passes out through the perforations of the member 32 and is further filtered by the element 50. Any moisture or other liquid content which may remain in the cleaned product which it is desired to have removed tends to coalesce on the surface of the element 50. The moisture, and the like, not shown, may be drawn off periodically from the jacket, if desired, by a drain outlet, not shown. The finely divided fibers of the elements 40 and 50 insure the complete cleaning of any gas or liquid passing through them. Obviously the elements 40 or 50 may be replaced as needed by removing the disk 18 or the cap 22. It seems equally obvious that only one side portion or half of the filter 5, as shown, may be used if desired.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A liquid filter and coalescer comprising a jacket, a fluid inlet to said jacket, a fluid outlet to said jacket, a partition in said jacket between said inlet and said outlet, a fluid passage through said partition, a first perforate tubate member connected at one end to the inlet side of said partition, a second perforate tubate member connected at one end to the outlet side of said partition, said ends of said tubate members which are connected to said partition being in fluid communication with each other through said fluid passage, a first cylindrical fibrous filter element disposed on said first tubate member, a second cylindrical fibrous filter element disposed on said second tubate member, means to seal the ends of each of said fibrous filter elements to prevent fluid bypass around said filter elements and into said tubate members, the seal on said second filter element including substantially coaxial sleeves penetrating both ends of said second filter element, and means to maintain said second filter element in compression between said coaxial sleeves.

2. A liquid and gas filter, including: a hollow cylindrical jacket having closed ends, said jacket having an inlet port adjacent a first end and an outlet port adjacent the end opposite said first end; a centrally bored partition rigidly carried centrally by said jacket; a first tubate member having an open end and a closed end, said open end being rigidly connected to one side of said partition and extending longitudinally within said jacket toward said first end; a second tubate member having an open end and a closed end, said open end rigidly connected to the side of said partition opposite said first described side thereof, for communication with the first said tubate member through said partition, the closed end of said second tubate member disposed in spaced-apart relation with the closed end of said jacket opposite said first end, said tubate members each having a plurality perforated wall; a first cylindrical fibrous filter element disposed within said jacket around said first tubate member with one end of said first filter element disposed adjacent said partition; cap means to retain said first filter element on said first tubate member; a second fibrous filter element disposed within said jacket around said second tubate member, said second element having a length substantially equal with relation to said second tubate member; a tubate cap disposed adjacent the closed end of said second tubate member, the wall of said cap projecting into the adjacent end of said second filter element; means for attaching said cap to the closed end of said second tubate member; and concentrically disposed sleeves rigidly connected at one end to each side of said partition, each one of said sleeves projecting into one end of each respective filter element for sealing said one end of each said filter element with said partition.

References Cited in the file of this patent

UNITED STATES PATENTS

| | | |
|---|---|---|
| 388,017 | Brownlow | Aug. 21, 1888 |
| 511,757 | Criqui | Jan. 2, 1894 |
| 1,663,322 | Tekavec | Mar. 20, 1928 |
| 2,016,161 | Wilderman | Oct. 1, 1935 |
| 2,265,550 | Smith | Dec. 9, 1941 |
| 2,339,703 | Kamrath | Jan. 18, 1944 |
| 2,617,986 | Miller | Nov. 11, 1952 |

FOREIGN PATENTS

| | | |
|---|---|---|
| 303,961 | Great Britain | Jan. 17, 1929 |
| 751,730 | France | Sept. 9, 1933 |